(12) United States Patent
Finnsson

(10) Patent No.: US 10,555,539 B2
(45) Date of Patent: Feb. 11, 2020

(54) CUTTING DEVICE AND A CUTTING SYSTEM FOR CUTTING FOOD PRODUCTS

(71) Applicant: MAREL ICELAND EHF, Gardabaer (IS)

(72) Inventor: Thorir Finnsson, Kopavogur (IS)

(73) Assignee: MAREL ICELAND EHF, Gardabaer (IS)

( * ) Notice: Subject to any disclaimer, the term of this patent is extended or adjusted under 35 U.S.C. 154(b) by 233 days.

(21) Appl. No.: 15/539,446

(22) PCT Filed: Dec. 22, 2015

(86) PCT No.: PCT/EP2015/080934
§ 371 (c)(1),
(2) Date: Jun. 23, 2017

(87) PCT Pub. No.: WO2016/102542
PCT Pub. Date: Jun. 30, 2016

(65) Prior Publication Data
US 2018/0084793 A1 Mar. 29, 2018

(30) Foreign Application Priority Data

Dec. 23, 2014 (DK) .................. 2014 70829
Apr. 16, 2015 (DK) .................. 2015 70224

(51) Int. Cl.
*A22C 17/00* (2006.01)
*A22C 25/18* (2006.01)
(Continued)

(52) U.S. Cl.
CPC .......... *A22C 17/0086* (2013.01); *A22C 25/18* (2013.01); *B26D 1/26* (2013.01);
(Continued)

(58) Field of Classification Search
CPC ... A22C 17/00; A22C 17/0006; A22C 17/002; A22C 17/0033
(Continued)

(56) References Cited

U.S. PATENT DOCUMENTS 3,982,299 A * 9/1976 Kompan ............... A22C 17/004
452/157
4,246,837 A * 1/1981 Chenery ............... A22C 17/008
452/134
(Continued)

FOREIGN PATENT DOCUMENTS

WO 2004106020 A1 12/2004
WO 2006064521 A1 6/2006
(Continued)

OTHER PUBLICATIONS

Danish Search Report for corresponding Danish Application No. PA 2015 70224, dated Jul. 14, 2015.
(Continued)

*Primary Examiner* — Richard T Price, Jr.
(74) *Attorney, Agent, or Firm* — Workman Nydegger

(57) ABSTRACT

A cutting device for cutting a food product that is conveyed by a conveyor means. The cutting device includes a first cutting blade and a moving mechanism attached to the first cutting blade for moving the first cutting blade sideways in either direction across the conveyor means, and a control unit. The first cutting blade is adapted to cut at least one incision in the product from one side of the product. The control unit is adapted to control the first cutting blade and the moving mechanism based on image data of the food product, and includes utilizing the image data in instructing the moving mechanism to adjust the position of the first cutting blade across the conveyor means.

12 Claims, 8 Drawing Sheets

(51) Int. Cl.
  *B26D 1/30*   (2006.01)
  *B26D 1/45*   (2006.01)
  *B26D 3/08*   (2006.01)
  *B26D 5/00*   (2006.01)
  *B26D 5/34*   (2006.01)
  *B26D 9/00*   (2006.01)
  *B26D 1/26*   (2006.01)
  *B26D 1/60*   (2006.01)
  *B26D 7/06*   (2006.01)
  *B26F 3/00*   (2006.01)

(52) U.S. Cl.
  CPC ............... *B26D 1/30* (2013.01); *B26D 1/45* (2013.01); *B26D 3/08* (2013.01); *B26D 5/007* (2013.01); *B26D 5/34* (2013.01); *B26D 9/00* (2013.01); *B26D 1/60* (2013.01); *B26D 7/0625* (2013.01); *B26F 3/004* (2013.01)

(58) Field of Classification Search
  USPC .................... 452/149–157, 160, 161
  See application file for complete search history.

(56) References Cited

U.S. PATENT DOCUMENTS

| | | | | |
|---|---|---|---|---|
| 4,557,019 A * | 12/1985 | Van Devanter | ........ | A22C 25/18 452/157 |
| 4,962,568 A | 10/1990 | Rudy et al. | | |
| 5,163,865 A * | 11/1992 | Smith | ................ | A22C 17/0086 452/157 |
| 5,192,243 A * | 3/1993 | Weustink | ................ | A22C 25/00 452/157 |
| 5,902,177 A * | 5/1999 | Tessier | ................ | A22C 17/0046 452/156 |
| 6,882,434 B1* | 4/2005 | Sandberg | ............ | A22C 17/0033 250/223 R |
| 7,404,759 B2* | 7/2008 | Sato | ..................... | A22B 5/0041 452/157 |
| 7,651,388 B2* | 1/2010 | Faires | ...................... | A22C 7/00 452/150 |
| 8,096,860 B2* | 1/2012 | Bolte | ................... | A22C 17/002 452/157 |
| 8,688,267 B2* | 4/2014 | Blaine | .................... | B07C 5/342 356/606 |

FOREIGN PATENT DOCUMENTS

| | | |
|---|---|---|
| WO | 2011095998 A1 | 8/2011 |
| WO | 2013132068 A1 | 9/2013 |
| WO | 2014169925 A1 | 10/2014 |

OTHER PUBLICATIONS

International Search Report for corresponding International PCT Application No. PCT/EP2015/080934, dated Apr. 1, 2016.

* cited by examiner

CUTTING DEVICE AND A CUTTING SYSTEM FOR CUTTING FOOD PRODUCTS

FIELD OF THE INVENTION

The present invention relates to a cutting device and to a method of cutting food products.

BACKGROUND OF THE INVENTION

Automation in the food industry is becoming more and more important, both to reduce manual labor and thus costs, but also to increase the yield in the food processing.

An example of such equipment is disclosed in WO2013132068 which describes a cutting apparatus for automatically cutting food products conveyed on a conveyor including at least one conveyor belt. A cutter (e.g. a water jet cutter) is arranged above a gap extending across the at least one conveyor belt and is positioned in relation to the gap such that the cutting path of the cutter extends through the food products and the gap and below the surface level of the at least one conveyor belt. The cutter is adapted to be connected to a control mechanism for operating movement of the cutter along the gap. The gap is formed between adjacent elongated supporting means such as rollers with a fixed internal arrangement, where the adjacent elongated supporting means and the cutter is adapted to be connected to the control mechanism for operating back and forth movement of the adjacent elongated supporting means and the cutter parallel to the conveying direction while maintaining the internal arrangement of the adjacent elongated supporting means and the cutter fixed.

The above mentioned equipment is especially suitable to be used within the fish industry where the part of a fillet with pin bones in white fish may be cut loose and removed automatically.

However, this equipment is not suitable for cutting the remaining part of the fish fillets into portions, e.g. to divide the loin part of the fish fillet into fixed weights pieces.

There is thus a need for a cutting device that is e.g. suitable to be used as an addition to the above mentioned device, or other similar devices, for enabling completing of the food processing, e.g. cutting the fish meat into pieces.

SUMMARY OF THE INVENTION

On the above background it is an object of embodiments of the present invention to provide a cutting device that may serve as a complementary device, e.g. in combination with the above-mentioned equipment as disclosed in WO2013132068, or as a stand-alone device for automatically cutting incisions in a food product or cut it into pieces in such a manner that parts between the incisions or said pieces may e.g. fulfill a pre-defined target such as a weight target.

In general, the invention preferably seeks to mitigate, alleviate or eliminate one or more of the above mentioned disadvantages of the prior art singly or in any combination. In particular, it may be seen as an object of embodiments of the present invention to provide a cutting device that solves the above mentioned problems, or other problems.

To better address one or more of these concerns, in a first aspect of the invention a cutting device is provided for cutting a food product that is conveyed by a conveyor means, the cutting device comprising:

a first cutting blade,
a moving mechanism attached to said first cutting blade for moving the first cutting blade sideways in either direction across the conveyor means, and
a control unit,
wherein said first cutting blade is adapted to cut at least one incision in the product from one side of the product,
wherein said control unit is adapted to control said first cutting blade and said moving mechanism based on image data of said food product, including utilizing said image data in instructing said moving mechanism to adjust the position of said first cutting blade across said conveyor means.

Accordingly, a cutting device is provided that is capable of cutting incisions in the food product such that e.g. a resulting piece or a piece produced later may e.g. fulfill a pre-defined target such as a weight target. A resulting piece may be produced in case at least one cutting process has already been performed, whereby the e.g. meat between two consecutive incisions is being separated, which piece of meat accordingly may e.g. fulfill a pre-defined target. A piece produced later may be e.g. the meat between two consecutive incisions, which is being separated later by e.g. a subsequent cutting process between the ends of the two consecutive incisions, and where the meat between the two consecutive incisions may e.g. fulfill a pre-defined target.

Also, the cutting device is especially suitable to be implemented as an extension to the equipment shown in WO2013132068. However, the cutting device may also be implemented as a stand-alone device.

The term cutting an incision may according to the present invention be understood as cutting through the product, which may include cutting a plurality of incisions in the product where the meat between the incisions are yet attached to the food product, and where the food product may subsequently undergo at least one cutting process where meat between the incisions are separated from the food product as pieces.

The image data, on the basis of which the moving mechanism is instructed to adjust the position of the first cutting blade across the conveyor means, may be provided by one of various suitable methods and systems such as a vision system, a laser imaging system, an ultraviolet system, a color vision system, a digital imaging system, a three-dimensional imaging system, an X-ray imaging system, etc. and possible combinations of these, by means of which data relating to the food product may be provided, e.g. shape, size, volume, color, texture, position on the conveyor means, structures of the food product, bone structures, etc.

The term cutting an incision may further also be understood as cutting through the product, which may include cutting at least a part of the food product into pieces, where typically the food product has already undergone at least one cutting process and where cutting an incision results in at least one cut piece that is separated from the food product.

The first cutting blade may be a rotatable cutting blade, which may be operated by a motor to cut said at least one incision in the product from one side of the product.

The operation of the first cutting blade to cut said at least one incision in the product by rotation may be controlled by the control unit, which is adapted to control said moving mechanism attached to the first cutting blade for moving the first cutting blade sideways in either direction across the conveyor means, e.g. in a direction essentially perpendicular to the conveying direction.

In one embodiment, the cutting device further comprises a second cutting blade adapted to cut at least one incision in the product from a side opposite to the side of the first cutting blade, and where the control unit is further adapted to control the second cutting blade.

Accordingly, it is possible to cut the food product into pieces or cut incisions in the food product, where the first and the second cutting blades may be controlled in an independent way, where e.g. on one side of the food product pieces or parts between consecutive incision of fixed target, e.g. weight target, are cut, e.g. of the loin part of a fish fillet, such as cod, whereas on the other side of the food product pieces or parts between consecutive incisions may be cut of a different target. In case the food product is a fish fillet, the parts of the fish fillet on either side of a substantially longitudinal cut may have different thicknesses, meaning that the length of the cut pieces or parts between consecutive incisions on one side is different than the length of the pieces or parts between consecutive incision on the other side, even if the target is the same, e.g. same weight target.

The second cutting blade may be a rotatable cutting blade, which may be operated by a motor to cut said at least one incision in the product from a side of the product opposite to the side, from which the first cutting blade may cut an incision in the product.

The operation of the second cutting blade to cut said at least one incision in the product by rotation may be controlled by the control unit, which is adapted to control said moving mechanism.

The first and/or the second cutting blade may be sword type rotating cutting blades, elongated cutting blades, preferably made of steel or steel alloy, and the like.

In one embodiment, said food product has, as mentioned, prior to being cut with one or more incisions, undergone a cutting process where at least one cut of the food product has been performed substantially longitudinal to the conveying direction. In this context longitudinally must be understood broadly, i.e. such that it covers any direction not perpendicular to the conveying direction, that being straight, curved and any combination of the two. It can also be explained as any cut having an angle in relation to an axis extending across the conveyor and perpendicular to the conveying direction. The adjustment of the moving mechanism comprises adjusting the position of at least said first cutting blade across said conveyor means such that it follows said at least one cut of the food product. The term "angle" is according to the present invention meant as an angle being different from 0°, where the at least one cut may have a variable angle, a fixed or substantially fixed angle, i.e. any type of cuts extending longitudinally or at least partly longitudinally along the food product and may e.g. have any type of shape such as a curved shape.

In one embodiment, said food product may after being cut with one or more incisions, undergo a subsequent cutting process where the (prospective) parts between consecutive incisions, that may e.g. be of pre-defined target, are cut from the remaining part of the food product resulting in pieces of e.g. fixed target. This subsequent cutting process may e.g. be performed by any type of a cutting means such as, but not limited to, high pressure water jet where preferably said image data of said food product may be utilized as operation parameters in the subsequent cutting process.

In one embodiment, said second cutting blade is further attached to said moving mechanism such that both the first and the second cutting blades are moved sideways in either direction across the conveyor means while the internal position of said first and second cutting blades are maintained fixed, i.e. the distance of the center of rotation of the two cutting blades is fixed.

Accordingly, the cutting device is capable of cutting the food product into pieces using said at least one substantially longitudinal cut as a reference cut, i.e. such that the first and the second cutting blades are adjusted in accordance to the position of said at least one substantially longitudinal cut, such that the end of the incision(s) corresponds to the location of the substantially longitudinal cut, i.e. the cut pieces are free from the remaining part of the food product. As an example, the cut pieces may subsequently be put in a tray and the like manually or automatically. The internal position of said first and second cutting blades is preferably the distance between the rotational axes of the cutting blades, but it may also be otherwise. Being operated independently meaning e.g. that one cutting blade may be stopped (not cutting) while the other one is cutting, or both may be cutting at the same time. This might e.g. be the case where a given cut is supposed to extend fully across the food product.

In one embodiment the moving mechanism comprises a frame structure that is slideable attached to tracks or similar means such as any type of track means, and where the first and the second cutting blades may be rotatable cutting blades that are rigidly attached to the frame structure such that the internal distance between e.g. the rotational axis of the first and the second cutting blades is fixed at all times. The first and the second cutting blades are typically also associated with a motor, respectively, and where the frame structure may further be adapted to also carry the motors. Accordingly, the back and forth movement of the cutting blades to adjust the length of an incision from one and/or the opposite side of the product is thus achieved via back and forth movement of the frame structure.

In one embodiment, the frame structure further comprises an opening arranged such that conveyor means which conveys the food product, and a conveyor means that receives the food product after undergoing the cutting process with the first and the second cutting blades are arranged substantially within the same height level as the opening. To ensure that neither of the conveyor means become damaged, it is of course ensured that the cutting plane of the first and the second cutting blades lies within the space between the two conveyors. The conveyor means may in one embodiment comprise conventional conveyors comprising a conveyor belt, respectively.

In one embodiment, the opening and a position of the conveyor means is preferably such that a side wise space is provided between the opening and the conveyor means so as to ensure that the frame structure does not collide with the conveyors during the back and forth movement of the frame structure. Thus, the width or in general the dimension of the opening is preferably designed with respect to the width of the conveyors and or the size/shape of the food product. Although not necessary for this embodiment, the frame structure may comprise circular and side by side arranged shaped recessions (or grooves) in the frame structure having a diameter substantially the same or slightly larger than the diameter of the cutting path of the respective one of the first and the second cutting blades. The center of the each of the side by side arranged recessions comprises an opening (not shown there) in the center through which the rotation axis of the respective one of the first and the second cutting blades extend.

The control unit is adapted to move the frame structure back and forth and thus move the cutting blades sideways in either direction across the conveyor means, while maintaining their internal position fixed, i.e. the distance between the rotational axis of the first and the second cutting blades are fixed.

In one embodiment, the controlling by said control unit further comprises operating the first and the second cutting blades independently. As already addressed, this may be of relevance where the pre-defined target of the pieces/parts between consecutive incisions fulfill different criteria, different size criteria, color criteria, weight criteria, where on one side of the substantially longitudinal cut the pre-defined target is different than that on the other side. Also, if the product has an uneven thickness such as fish fillet, and the pre-defined target is the same, e.g. fixed weight target, then the length of the pieces, or the length of the parts between the incisions, will be different. In case the food product is fish fillet such as cod, the belly part is significantly thinner than the loin part of the fish fillet, meaning that the pieces or length of the parts between the incisions from the belly part will be longer than the pieces or the length of the parts between the incisions from the loin part. Thus, by operating the first and the second cutting device in an independent way it is possible to achieve this.

In one embodiment, said first and said second cutting blades are arranged within the same plane such that the cutting plane is substantially the same, where a distal end of said first cutting blade and a distal end of said second cutting blade, when said distal ends are facing each other, overlap partly. In one embodiment, the first and second cutting blades are adjusted such that when said first and second distal ends are substantially horizontal and are pointing towards each other, one of the distal ends is positioned above the other distal end. Or put in other words, the rotational movement of the first and the second cutting blades is adjusted such that a phase shift is present to avoid a collision of the two cutting blades when they simultaneously are in a horizontal position and facing each other.

Accordingly, by performing a simultaneous cut with the first and the second cutting blades it is possible to perform a complete cut across the food product, i.e. to separate a part of the food product from the remaining part of the food product. In case the food product is fish fillet, this might be the case where the tail part is to be separated from the remaining part of the fish fillet.

In one embodiment, said first and/or said second cutting blade(s) is/are arranged in such a manner that the cutting plane of the cutting blade or the cutting blades may be tilted in relation to vertical. Thus, it is possible to cut incisions in the food product under an angle instead of a vertical cut, whereby e.g. the appearance of the resulting food products can be improved, for example so they look more natural and/or more appealing to the customer.

In one embodiment, the respective moving mechanisms, etc. associated with the cutting blade or the cutting blades are tiltable together with the cutting plane of the cutting blade or the cutting blades.

In a second aspect of the invention a method is provided of cutting a food product conveyed by a conveyor means using a cutting device which comprises:
 a first cutting blade,
 a moving mechanism attached to said first cutting blade for moving the first cutting blade sideways in either direction across the conveyor means, and
 a control unit,
wherein said first cutting blade is adapted to cut at least one incision in the food product from one side of the product, wherein said control unit is adapted to control said first cutting blade and said moving mechanism based on image data of said food product, including utilizing said image data in instructing said moving mechanism to adjust the position of said first cutting blade across said conveyor means.

In one embodiment, the cutting further comprises a second cutting blade adapted to cut at least one incision in the product from a side opposite to the side of the first cutting blade, and where the control unit is further adapted to control the second cutting blade.

In one embodiment, said food product has, prior to being cut with one or more incisions, undergone a cutting process where at least one cut of the food product has been performed having an angle in relation to an axis extending across the conveyor and perpendicular to the conveying direction, where the adjustment of the moving mechanism comprises adjusting the position of at least said first cutting blade across said conveyor means such that it follows said at least one cut of the food product.

In one embodiment, the food products is fish fillets and where the at least one cut may include cuts on both sides of the pin bones preferably such that the cut is around the pin bone area in the fish fillet. Said at least one cut may further include a cut extending along the fish fillet from the pin bones or pin bone area and at least partly towards the tail end of the fish fillet. The term cut around should preferably be construed as being a cut or cuts that encase the pin bones of the fish fillets such that all the pin bones are within the area defined by the cut or cuts. The fact that the pin bone areas may vary between fishes means that the cut or cuts around the pin bone areas may have different shapes.

In one embodiment, the pieces of food products have a fixed target such as a fixed weight target.

In a third aspect of the invention a cutting system is provided for cutting a food product conveyed by a conveyor means, comprising:
 an imaging system,
 a cutting device comprising:
 a first cutting blade,
 a moving mechanism attached to said first cutting blade for moving the first cutting blade sideways in either direction across the conveyor means, and
 a control unit,
wherein said first cutting blade is adapted to cut at least one incision in the product from one side of the product, wherein said control unit is adapted to control said first cutting blade and said moving mechanism based on image data of said food product, including utilizing said image data in instructing said moving mechanism to adjust the position of said first cutting blade across said conveyor means.

In one embodiment, the cutting system further comprises:
 a second cutting blade adapted to cut at least one incision in the product from a side opposite to the side of the first cutting blade, and where the control unit is further adapted to control the second cutting blade,
 a cutting mechanism operated by the control unit for performing at least one cut of the food product having an angle in relation to an axis extending across the conveyor and perpendicular to the conveying direction, where the adjustment of the moving mechanism comprises adjusting the position of at least said first cutting blade across said conveyor means such that it follows said at least one cut of the food product.

The above mentioned product should of course not be construed as being limited to a fish fillet, but can be any type of product that can be used in relation to the present invention, such as poultry meat, beef, pork etc, where the at least one cut may e.g. be a single cut or two or more cuts extending along the food product, and where the aim is to produce food pieces fulfilling pre-defined target such as fixed sizes or fixed weight target.

Said imaging system may in one embodiment comprise an X-ray system and where the image data comprises X-ray data.

Where this description refers to weight of pieces, weight of parts between consecutive incisions, etc., the weight is in most cases derived from volume measurements based on the imaging data. For example, in case an X-ray system is used for providing image data, such X-ray data may be used for providing volume data, whereon weight data may be based. Other methods and systems may be used as well for providing volume measurements. Also, other methods and apparatus may be used for providing weight data of the pieces, parts, etc. Furthermore, conventional weighing devices may be used for providing weight data for the food products or pieces of the food products. Such a conventional weighing device or devices may also be used in combination with the before-mentioned weight determination methods and systems.

When using an X-ray imaging system for providing the image data for the food product, this may also be utilized for providing information regarding bones, e.g. the location of pin bones in a fish fillet where based thereon the pin bone area may be determined, whereby the provided image data may also be utilized for controlling the at least one cut in a direction that may essentially be longitudinal to the conveying direction, whereby cuts can be made on both sides of a pin bone area, or form an angle different from zero compared to an axis perpendicular to the conveying direction as discussed previously.

As it is understood, the device presented in this application is able to cut incisions in the food product from one or both sides of the food product and in combination with a cutter device as e.g. the one described in WO2013132068 it can cut a food product into pieces. If e.g. the mentioned cutter device (WO2013132068) initially cuts and splits the food product longitudinally in relation to the conveyor direction, and the cutter device of this application cuts incisions from one side afterwards, then the result of the operation performed by the cutter device of this application is cut pieces. Whereas, if e.g. the cutter device of this application initially cuts incisions in the food product from one side, then only if a cutter device like the one described in e.g. WO2013132068, cuts a longitudinally cut at the end of the incisions afterwards, the result will be pieces. As the sequence of the cutting devices mentioned can be random, both the term "incision" and the term "piece" is used in the description. Also in some cases the combination "incision/piece" is used.

In general the various aspects of the invention may be combined and coupled in any way possible within the scope of the invention. These and other aspects, features and/or advantages of the invention will be apparent from and elucidated with reference to the embodiments described hereinafter.

BRIEF DESCRIPTION OF THE DRAWINGS

Embodiments of the invention will be described, by way of example only, with reference to the drawings, in which.

DESCRIPTION OF EMBODIMENTS

Figure 1:
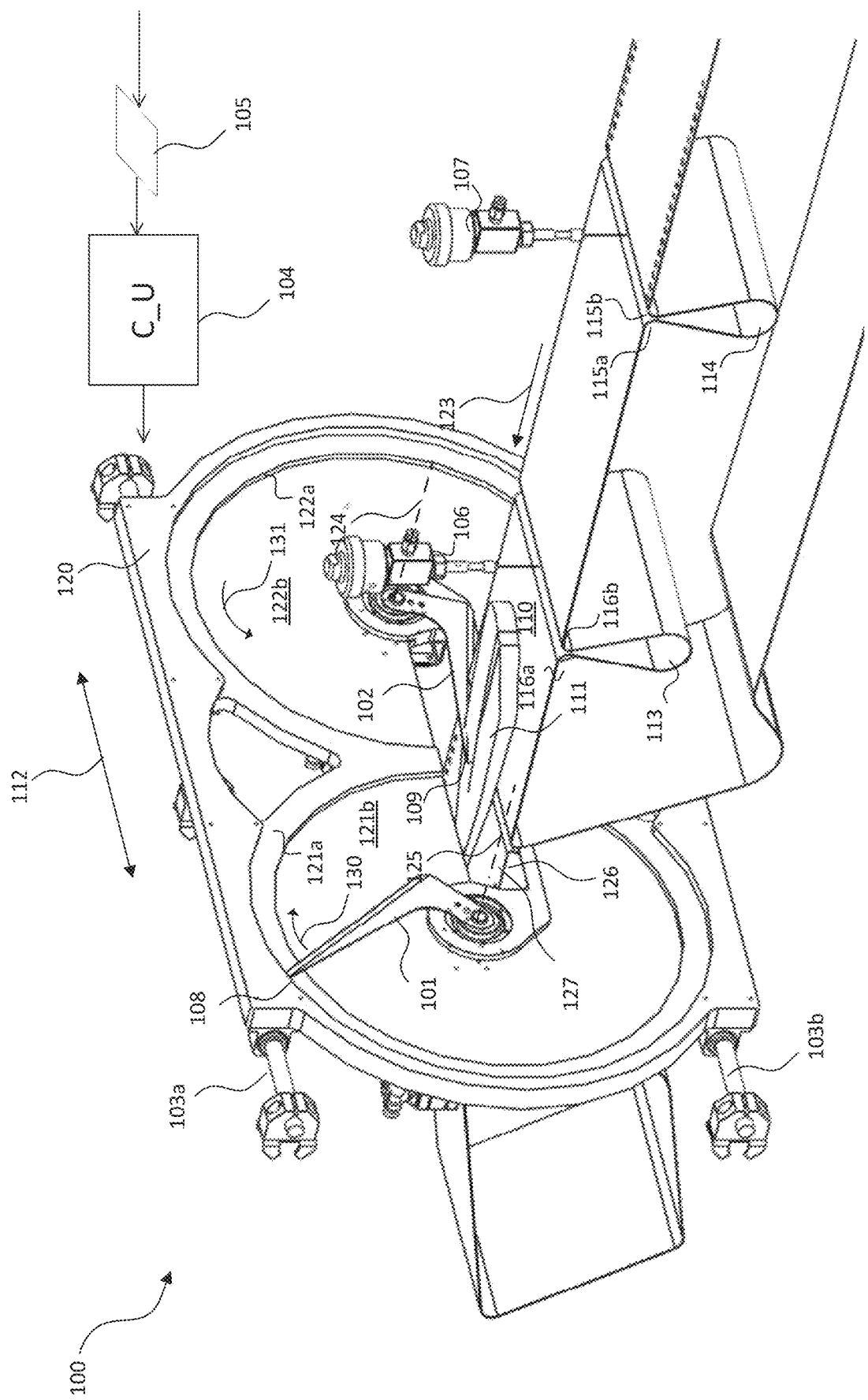
FIG. 1 depicts a cutting device according to the present invention for cutting a food product conveyed by a conveyor means into pieces.

FIG. 1 depicts a cutting device 100 according to the present invention for cutting a food product 111 conveyed by a conveyor means 110 in a direction as indicated by arrow 123. The view of the cutting device shown in this embodiment is a view seen from the upstream end of the cutting device (a front view) where the cutting device 100 comprises a first cutting blade 101, a second cutting blade 102, a moving mechanism and a control unit 104. The present invention should not be construed as being limited to two cutting blades, but a single cutting blade may just as well be implemented.

The moving mechanism comprises a frame structure 120 that is slideable attached to parallel tracks 103a,b or similar means such as any type of track means, and where the first and the second cutting blades 101, 102 are, as shown here, rotatable cutting blades that are rigidly attached to frame structure 120 such that the internal distance between the rotational axis 124, 125 of the first and the second cutting blades 101, 102 is fixed at all times having a clockwise 130 and counterclockwise 131 rotational direction. The first and the second cutting blades 101, 102 are typically also associated with a motor (not shown here), respectively, on the distal side of the frame structure 120, where the frame structure 120 must thus also carry the motors. Accordingly, the back and forth movement of the cutting blades 101, 102 as indicated by the arrow 112 is thus achieved via back and forth movement of the frame structure 120.

The frame structure 120 further comprises an opening 126 arranged such that the conveyor means 110 which conveys the food product 111, and a conveyor means 127 that receives the food product after undergoing the cutting process with the first and the second cutting blades 101, 102, are substantially within the same height level within the opening. To ensure that neither of the conveyor means 110 and 127 become damaged, it is of course ensured that the cutting plane of the first and the second cutting blades 101, 102 lies within the space between two conveyor means 110, 127.

Figure 9:
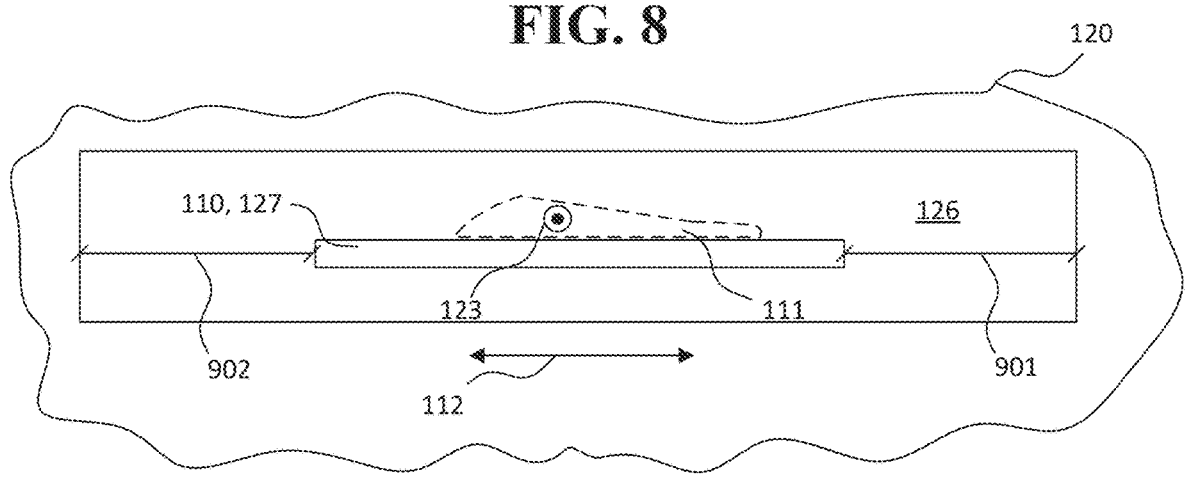
FIG. 9 shows a schematic zoomed up view of FIG. 1, FIGS. 10 and 11 show a downstream view and an upstream view of a cutting device according to the present invention.

For further clarification, FIG. 9 shows a schematic zoomed up view of the opening 126 and a position of the conveyors 110, 127 in relation to the opening. Due to the back and forth movement of the frame structure 120 a sufficient side space 901, 902, must be provided between the opening 126 and the conveyors 110, 127 so as to ensure that the frame structure 120 does not collide with the conveyors 110, 127 during the back and forth movement as indicated by the arrow 112. Thus, the width or in general the dimension of the opening is preferably designed with respect to the width of the conveyors and or the size/shape of the food product 111.

Although not necessary for the embodiment shown here, the frame structure 120 may comprise circular and side by side arranged shaped recessions comprising inner deeper recessions 121b, 122b (or grooves) and outer shallower recessions 121a, 122a in the frame 120 structure, where the outer recessions 121a, 122a have a diameter substantially the same or slightly larger than the diameter of the cutting path of the respective one of the first and the second cutting blades 101, 102. The center of the each of the side by side arranged recessions 121, 122 comprises an opening (not shown there) in the center of the recessions through which the rotation axis of the respective one of the first and the second cutting blades 101, 102 extend.

Although the first and the second cutting blades 101, 102 are shown here as being fully exposed and facing the conveyor 110, which may also be considered as being an infeed conveyor, the cutting blade side may as will be discussed later in relation to FIGS. 10 and 11 be facing conveyor 127, which may also be considered as a take-away conveyor.

Moreover, a shield or similar means (not shown) may be provided in front of the first and the second cutting blades 101, 102 to ensure safety of the operator operating the cutting device.

The control unit is adapted to move the frame structure back and forth as indicated by arrow 112 and thus move the cutting blades sideways in either direction across the conveyor means sideways in either direction across the conveyor means, while maintaining their internal position fixed, i.e. the distance between the rotational axis of the first and the second cutting blades are fixed.

Both the first and the second cutting blades 101, 102 are adapted to cut an incision in the product from opposite sides of the food product and the control unit 104 is preferably also adapted to control the first 101, and the second 102 cutting blades independently meaning e.g. that one cutting blade may be performing a cut while the other one is not.

The food product may in one embodiment, prior to being cut into pieces that are separated from the food product or cut by incisions into parts that are not yet separated from the food product, undergo a cutting process by a cutting means 106, 107, which may be a high pressure water cutter, where at least one cut of the food product has been performed. As will be discussed in more details later, the assumption is made that the food product has undergone a cutting process, e.g. by a high pressured water cutter or any other cutting means, and where the cut by the first and the second cutting blades results in a number of pieces that are separated from the food product.

In case the food product is fish fillet such as cod fillet, the at least one cut may be a cut around the pin bones and may also include a further cut extending from the pin bones towards the tail part of the fish fillet. This cut has an angle in relation to an axis extending across the conveyor and perpendicular to the conveying direction.

The above mentioned controlling of the moving mechanism 103a,b is preferably based on image data 105 that include position related data indicating the position of the at least one cut, e.g. around the pin bones, and where this position related data 105 are utilized as an operation parameter by the control unit 104 for controlling the back and forth placement of the moving mechanism as indicated by arrow 112.

As shown here, the cutting means 106, 107 used for performing the at least one cut, are positioned above gaps 113, 114, respectively, formed between adjacent elongated supporting means 116a,b, 115a,b, respectively, with a fixed internal arrangement. The adjacent elongated supporting means and the cutters 106, 107 which could just as well be a single cutter or more than two cutters, is connected to a control mechanism (not shown) for operating back and forth movement of the adjacent elongated supporting means 116a, b, 115a,b and for operating the cutters 106, 107 across the conveyor 110 perpendicular to the conveying direction while maintaining said internal arrangement of the adjacent elongated supporting means and the cutter fixed.

The first and said second cutting blades 101, 102 are as shown arranged within the same plane such that the cutting plane is substantially the same. Moreover, the dimension of the blades is preferably such that a distal end 108 of the first cutting blade and a distal end 109 of the second cutting blade, when the distal ends are facing each other, overlap partly. This is to ensure that a cut across the whole food product is possible. Also, to avoid that the cutting blades 101, 102 will come in contact with each other, it is preferred that the cutting blades are adjusted such that when the first and second distal ends 108, 109 are substantially horizontal and are pointing towards each other, one of the distal ends is positioned slightly above the other distal end. Or put in other words, the rotational movement of the first and the second cutting blades is adjusted such that a phase shift of the first and the second cutting blades is present so as to avoid that the blades collide when the cutting blades are simultaneously in a horizontal position and facing each other.

Figure 2:
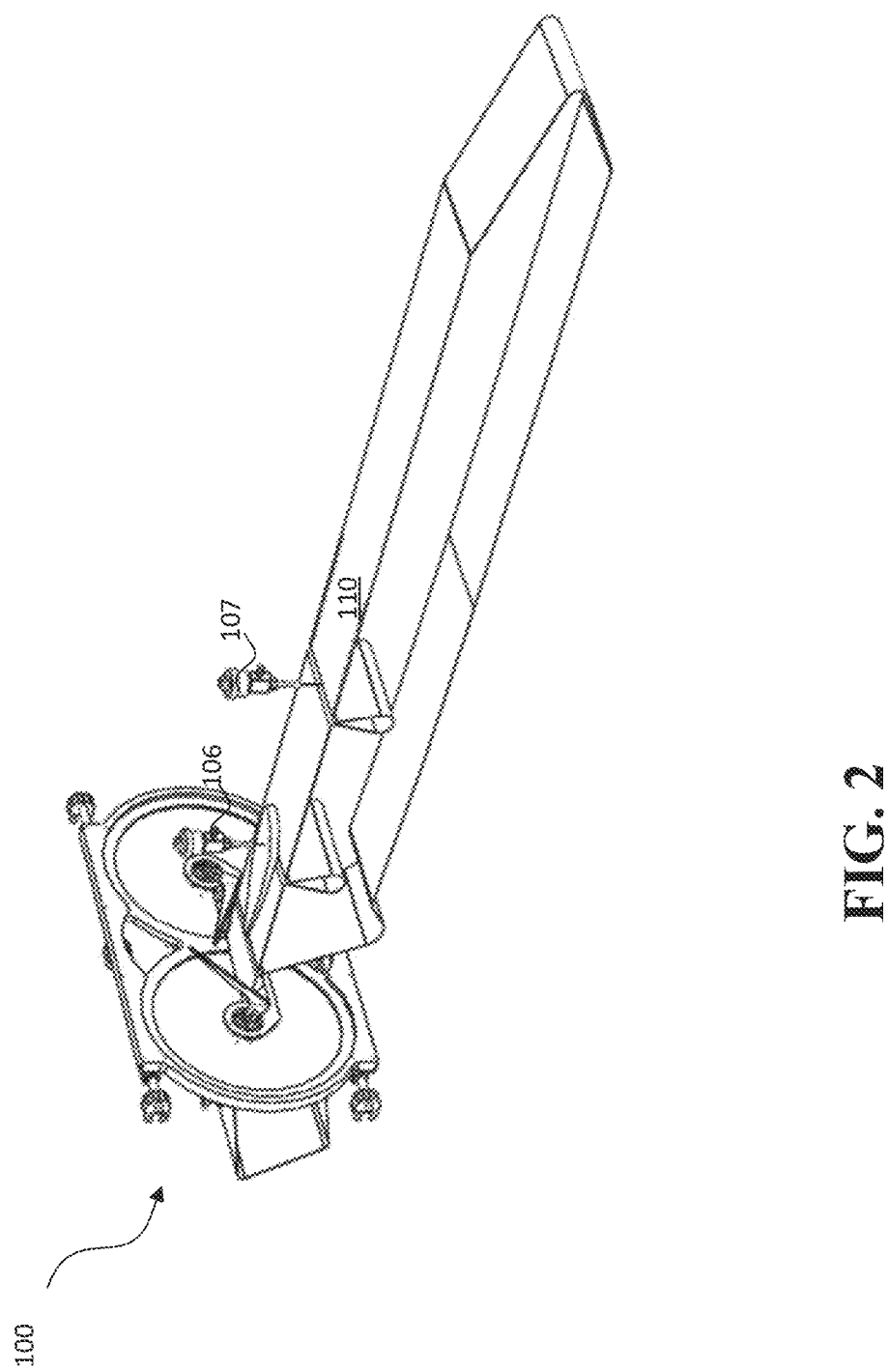
FIG. 2 shows a zoomed out view of FIG. 1, showing in more details the conveyor means where the at least one cutting process takes place.

FIG. 2 shows a zoomed out view of FIG. 1, showing in more details the conveyor means where the at least one cut process takes place.

The food product may be, but is not limited to, a fish fillet such as a cod fillet and where the at least one cut performed by the cutting means 106, 107 may be a cut around the pin bone areas of the cod and where a further cut or cuts may be performed including e.g. a cut extending from the pin bone area towards the tail part of the cod. The cutting means 106, 107 may just as well be based on using a single cutting means (not shown) or two or more cutting means.

The data that operate the cutting means 106, 107 may be X-ray data that originate from an X-ray source (not shown) that depict the bone structure within the food product (the fish fillet).

Figure 3:
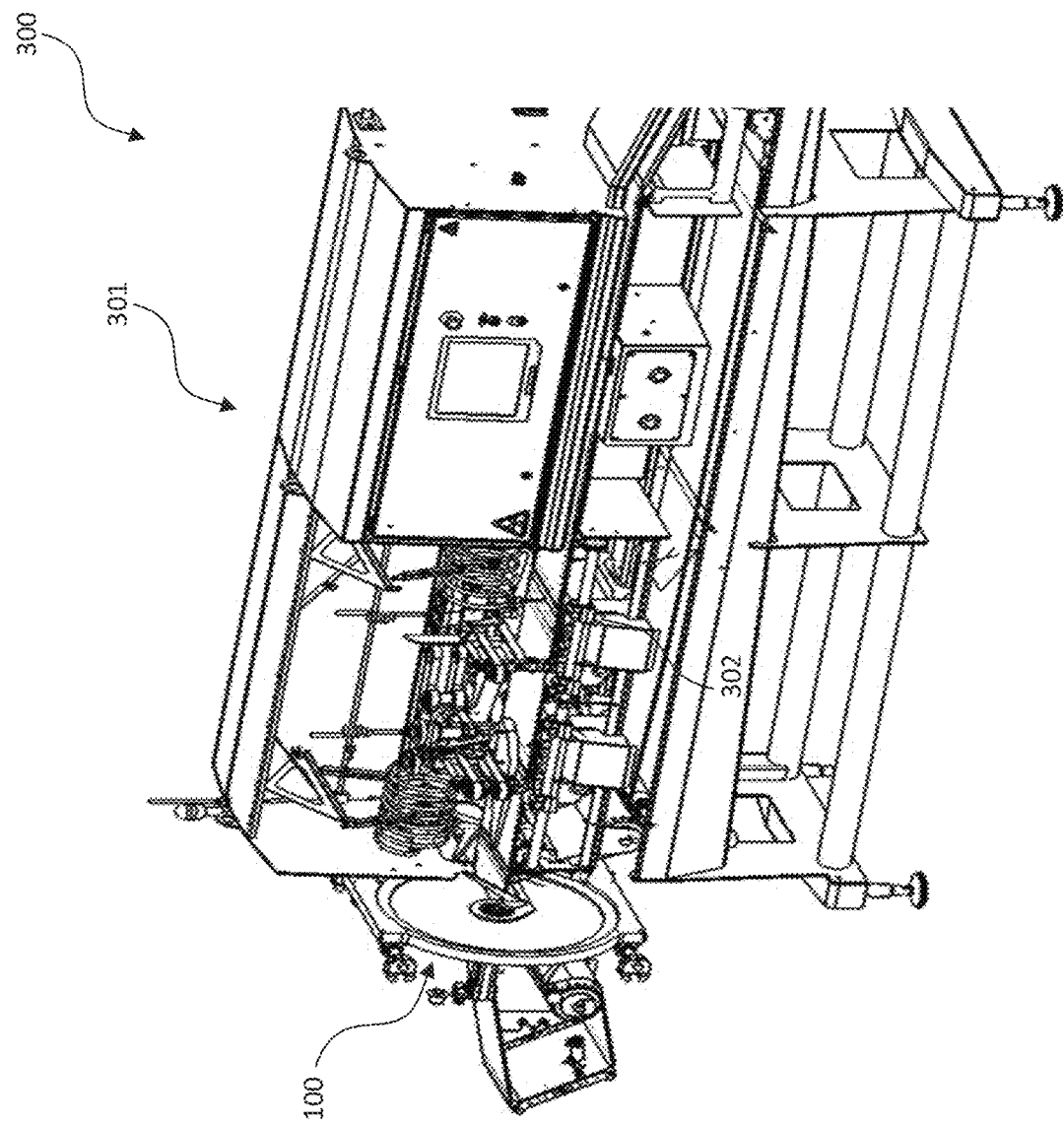
FIG. 3 shows a cutting system according to the present invention.

FIG. 3 shows a cutting system 300 according to the present invention comprising a cutting apparatus 301 such as the one disclosed in WO2013132068, hereby incorporated in its entirety by reference, comprising at least one conveyor belt 302, a cutter arranged above a gap (see e.g. FIGS. 1 and 2) extending across said at least one conveyor belt where the cutter is positioned in relation to the gap such that the cutting path of the cutter extends through the food products and the gap and below the surface level of said at least one conveyor belt. The cutter is adapted to be connected to a control mechanism for operating crosswise movement of the cutter along said gap. The cutter and the gap may be similar or identical to the one shown in FIGS. 1 and 2. Also, as disclosed in WO2013132068, the gap may be formed by a single conveyor belt as shown in FIGS. 1 and 2, or via two or more conveyors that are placed adjacent to each other.

Figure 4:
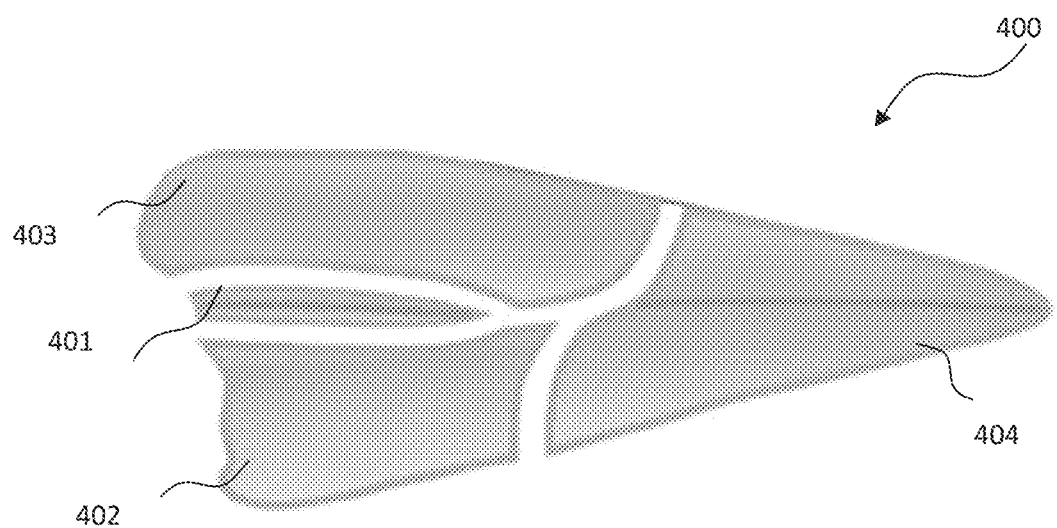
FIGS. 4-8 depict graphically examples of cuts that a fish fillet has undergone.

FIG. 4 depicts graphically an example of cuts and incisions in a fish fillet 400 that has undergone a cutting process in e.g. the cutting apparatus 301 shown in FIG. 3, where said at least one cut includes cuts around the pin bone area 401 where the loin 403 and the belly 402 and the tail part 404 have been separated from the pin bones 401.

Figure 5:
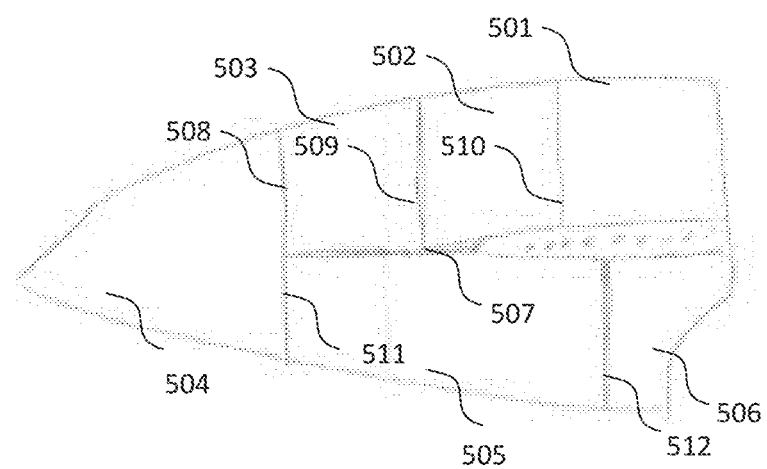
Figure 6:
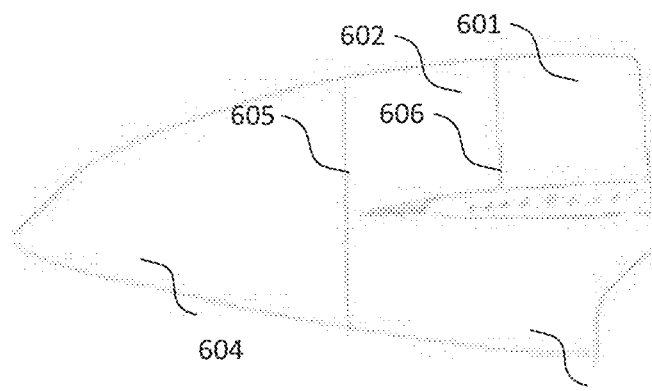

FIGS. 5 and 6 depict an example where the fish fillet has undergone a cutting process by the cutting device 100 according to the present invention, where in FIG. 5 the loin has been cut into three pieces 501-503, i.e. by incisions 508-510 from the loin side and a cut 507 essentially in the longitudinal direction, the belly part has been cut into two pieces 505, 506, i.e. by incisions 511, 512 from the belly side and the cut 507 essentially in the longitudinal direction and the tail is a single piece 504, which is produced by the two incisions 508 and 511 being cut in the fish fillet from each side. In FIG. 6 the loin has in a similar manner been cut into two pieces 601, 602 by the incisions 605, 606, the belly 603 is a single piece and also the tail part 604 is a single piece, provided via the incisions 605.

Figure 7:
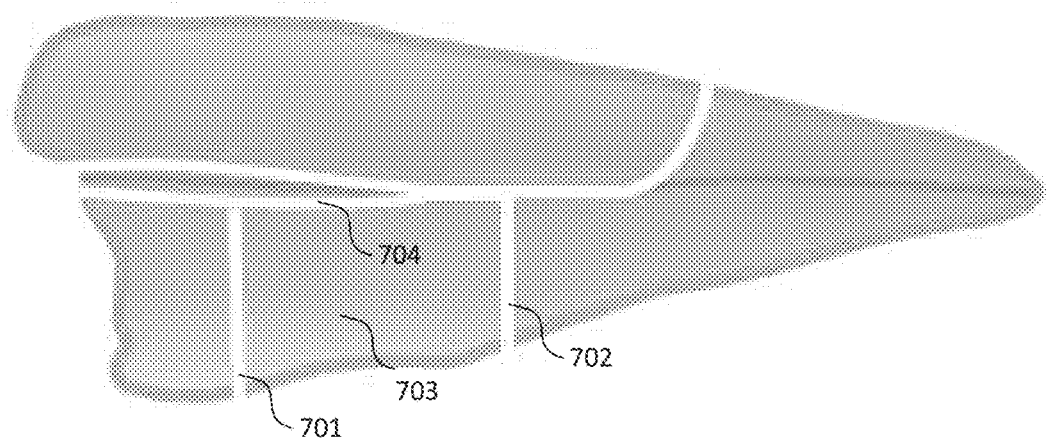

FIG. 7 depicts graphically a further example of cuts and incisions in a fish fillet that has undergone a cutting process in a cutting apparatus according to an embodiment of the invention. Here, the fish fillet has been cut on both sides of the pin bone area and by a cut 704 essentially in the longitudinal direction, which terminates at the loin side of the fish fillet. Further, two incisions 701, 702 have been made from the belly side at both ends of a belly part 703 and resulting in two belly parts, one loin part and one tail part. All or almost all of these parts may have been produced to fulfill a pre-defined target criterion or target criteria.

Figure 8:
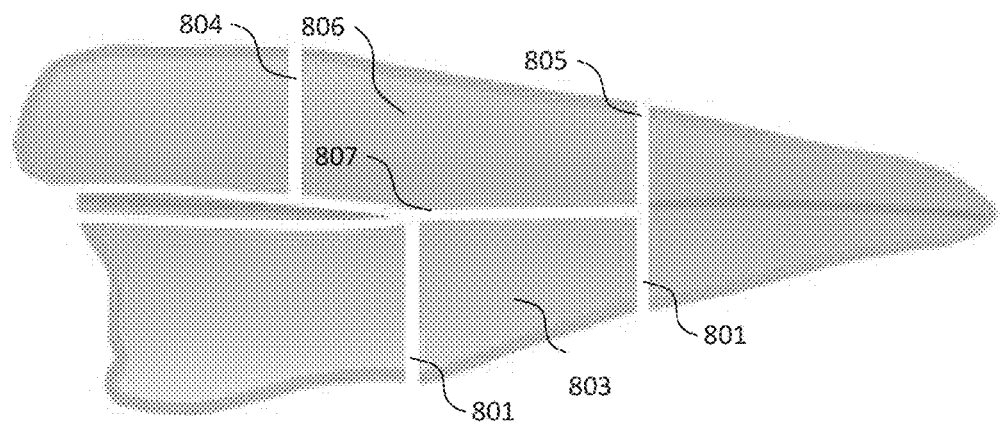

FIG. 8 depicts graphically an even further example of cuts and incisions in a fish fillet that has undergone a cutting process in a cutting apparatus according to an embodiment of the invention. Here, the fish fillet has been cut on both sides of the pin bone area and by a cut 807 essentially in the longitudinal direction, which terminates a distance from the tail. Further, two incisions 801 have been made from the belly side at both ends of a belly part 803, two incisions 804, 805 have been made from the loin side at both ends of a loin part 806, resulting in total in two belly parts, two loin part and one tail part. All or almost all of these parts may have been produced to fulfill a pre-defined target criterion or target criteria.

As it will be understood, the incisions from the sides of the fish fillets shown in FIGS. 4-8 may be cut before the at least one cut in the essentially longitudinal direction is being made or vice versa, as it has been explained above.

Figure 10:
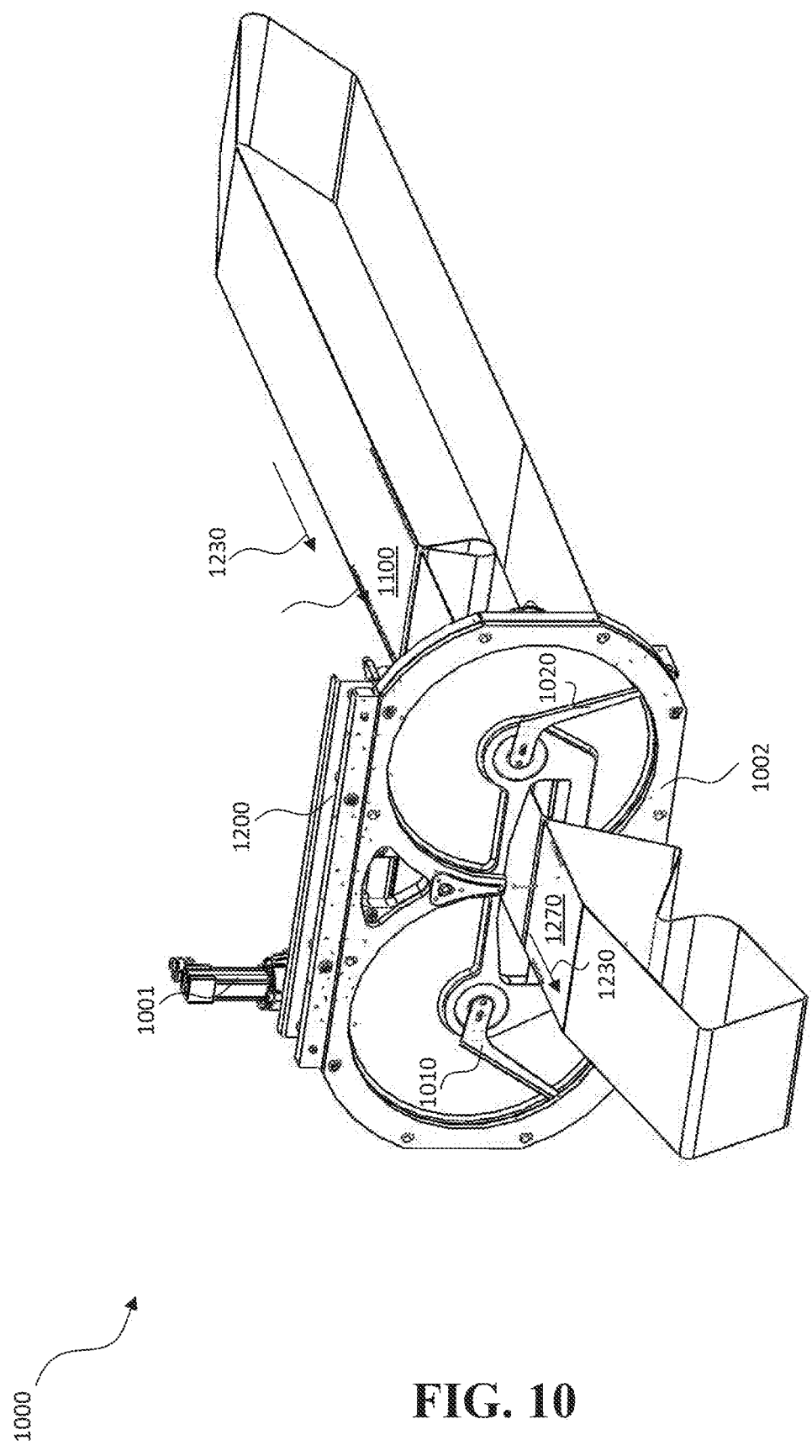
Figure 11:
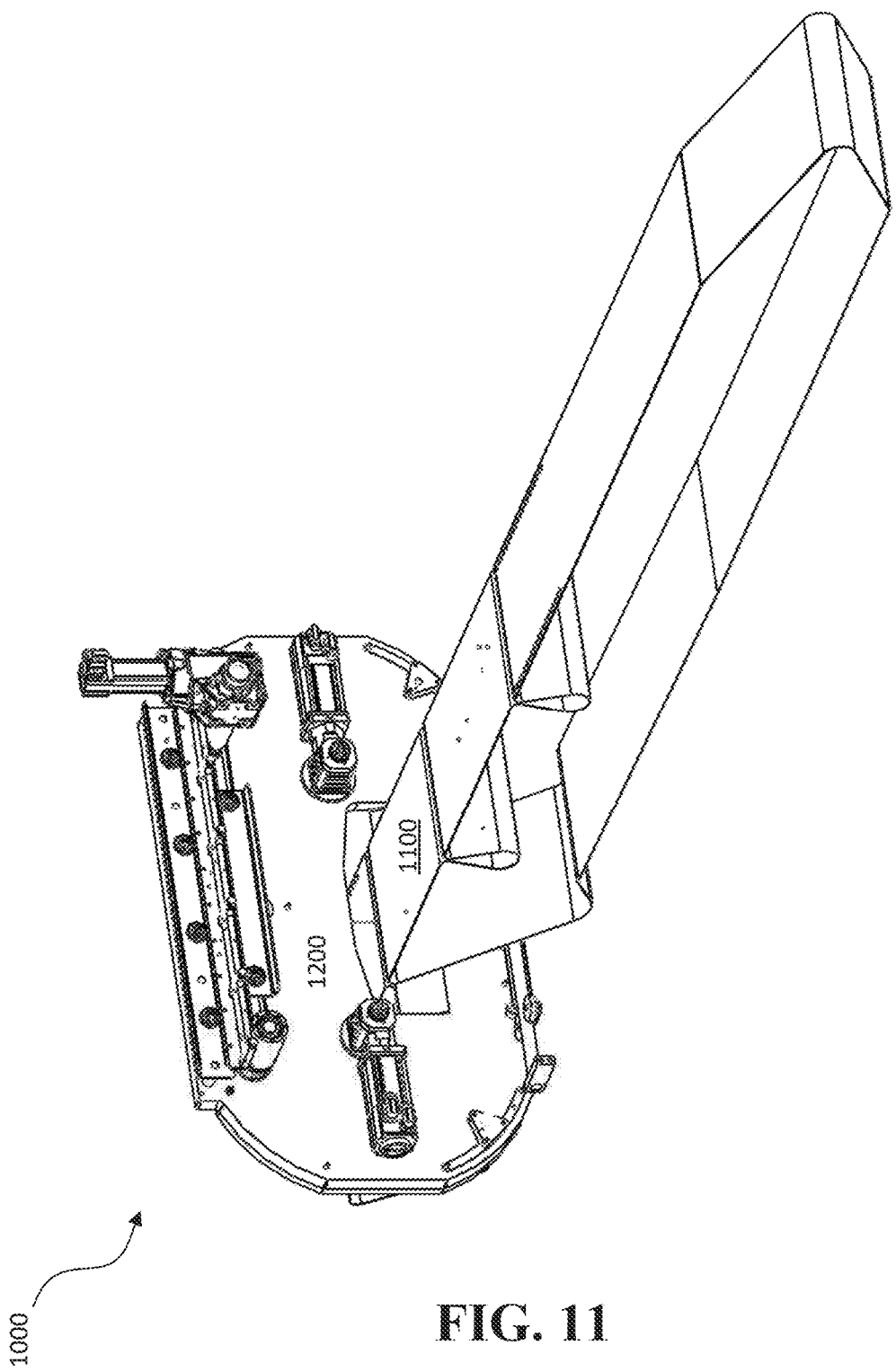

FIG. 10 shows a view seen from the downstream end of a cutting device 1000 according to the present invention for cutting a food product conveyed by a conveyor means 1100 in a direction as indicated by arrow 1230 from a conveyor means 1100, and FIG. 11 shows a view seen from the upstream end of the cutting device in FIG. 10, where the cutting device in FIGS. 10 and 11 is more or less similar as discussed in relation to FIGS. 1 and 2.

The cutting device comprises, similarly as discussed in relation to FIGS. 1 and 2, a first and the second cutting blades 1010, 1020 and a frame structure 1200 that is slideable mounted to at least one rail or track 1200 for supporting the first and the second cutting blades 1010, 1020 in a similar way as discussed in relation to FIGS. 1 and 2, and where a motor 1001 controlled by a control unit moves the frame structure 1200 and thus the first and the second cutting blades 1010, 1020 in a back and forth movement, similar as already described.

As also discussed, the food product undergoes one or more cutting processes, e.g. as discussed previously e.g. with one or more high pressure water jets, and where a conveyor means 1270 receives the cut food product, and thus acts in a way as a take-away conveyor. The cut food product may e.g. be cut similar as discussed in any of the FIGS. 4-8.

The essential difference between the cutting device 1000 shown in FIGS. 10 and 11 and the one shown in FIGS. 1-3 is however the arrangement of the first and the second cutting blades 1010, 1020 and a frame structure 1200, which has been mirrored compared to what FIGS. 1 and 2 shows, i.e. the first and the second cutting blades 1010, 1020 are facing the conveyor means 1270.

Moreover, the embodiment shown here further comprise a shield or a cover 1002 for the first and the second cutting blades 1010, 1020, which may also be considered as a guide for first and the second cutting blades 1010, 1020.

Figure 12:
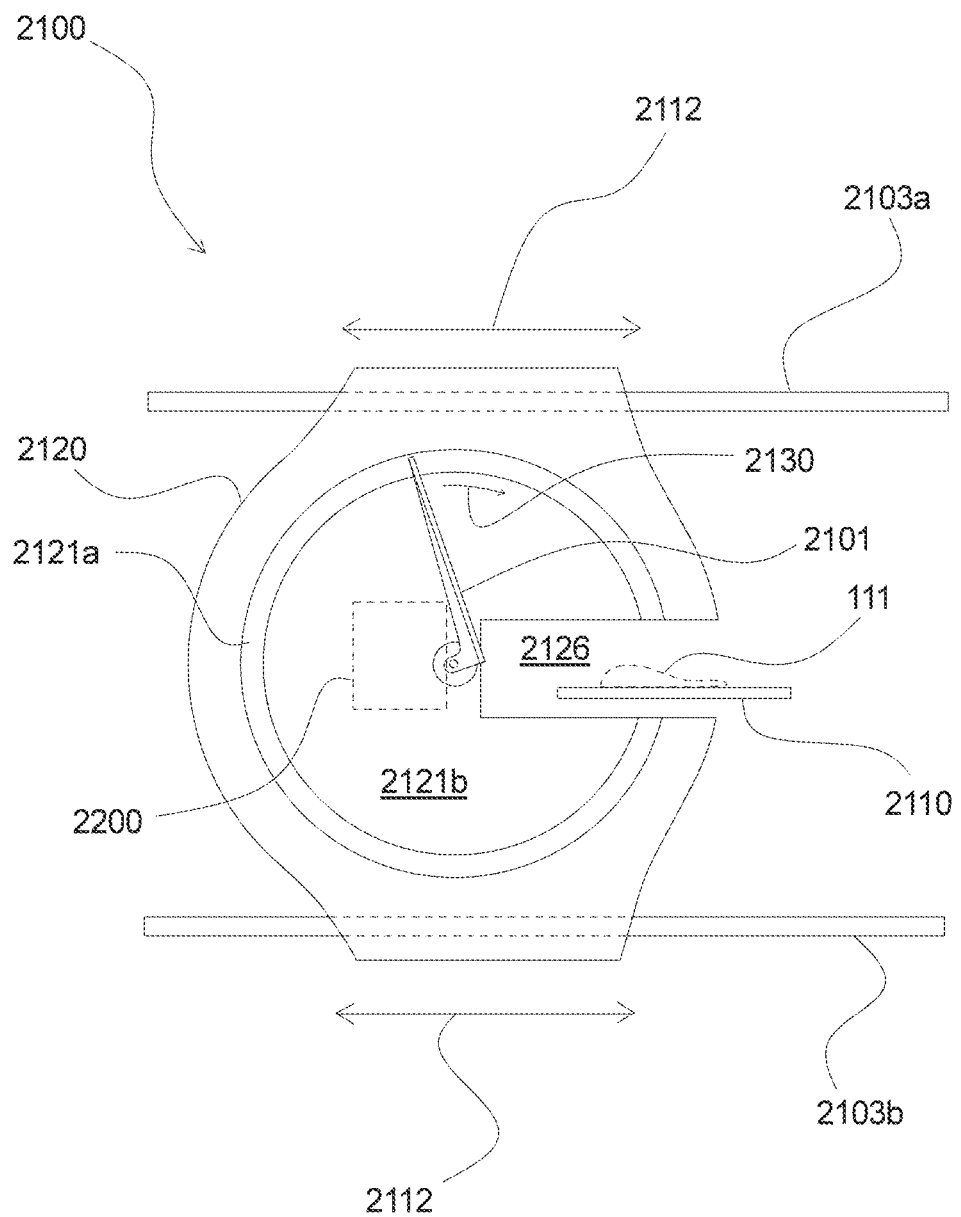
FIG. 12 shows a schematic view seen from e.g. the upstream end of a cutting device having a single cutting blade according to an embodiment of the present invention.

FIG. 12 shows a schematic view seen from e.g. the upstream end of a cutting device 2100 according to an embodiment of the present invention for cutting a food product 111 conveyed by a conveyor means 2110, which cutting device 2100 comprises a single cutting blade 2101, i.e. a first cutting blade only. The cutting device shown in FIG. 12 is otherwise more or less similar to the devices as discussed in relation to FIGS. 1, 2, 10 and/or 11.

Thus, the cutting device 2100 comprises a frame structure 2120 that is slideable attached to e.g. a pair of parallel tracks 2130a and 2130b, on which it is movable back and forth by means of drive means (not shown in FIG. 12). The cutting blade 2101 is rotatably arranged in the frame structure 2120, where the frame structure 2120 may be designed in a manner similar to the frame structure shown in e.g. FIG. 1, i.e. with circular recessions 2121a and 2121b. The inner recession 2121b is a deeper recession and the outer recession 2121a is a shallower recession, where the latter has a diameter substantially the same or slightly larger than the rotation diameter of the cutting blade 2101. Further, a shield or similar means (not shown in FIG. 12) may be arranged in front of the cutting blade 2101, e.g. a shield having an extent corresponding to the recession 2121a and possibly part of the recession 2121b, to ensure safety of the operator operating the cutting device 2100.

The frame structure 2120 comprises an opening 2126, which is arranged such that the food products 111 and conveyor means for the food products 111 do not interfere with the frame structure during the back and forth movement of the frame structure 2120 and during the conveying and cutting of the food products 111. The respective conveyor means for the food products 111 in the area of the opening 2126 comprises the conveyor 2110 as shown in FIG. 12 for conveying the food products 111 to the cutting device and a receiving conveyor (not shown in FIG. 12) for the cut food products, which conveyors are arranged substantially at the same level within the opening and with a gap between the conveyor ends, which is sufficiently large for the cutting blade 2101 to pass through.

The single cutting blade 2101 is as mentioned rotatably arranged as indicated with the arrow 2130, and a drive motor 2200 may be arranged at the frame structure 2120 for operating the cutting blade 2101. The cutting blade 2101 is adapted for cutting an incision in the food product 111 from the side of the product, controlled by a control unit (not shown in FIG. 12) and based on e.g. image data including position related data (cf. e.g. FIG. 1). The control unit may further be adapted for controlling the back and forth movement of the frame structure.

Thus, for cutting an incision in the food product 111 from one side of the product, data is supplied to the control unit relating to
 e.g. the position of the food product 111 on the conveyor 2110 and e.g. the shape of the food product and the conveying speed,
 the position of the intended incision along the length of the food product in the conveying direction and
 the intended length of the incision in the food product.

Based on these data, the frame structure 2120 is controlled by the control unit to adjust its position across the conveyor means to correspond to the intended length of the incision in the food product and the cutting blade 2101 is controlled to, operated by the drive motor 2200, to cut the incision in the food product 111 at a time corresponding to the position of the intended incision along the length of the food product 111 in the conveying direction.

As explained in connection with other embodiments, further cuts may be made in addition to the one or more incisions made from one side of the food product 111 such as e.g. cuts made essentially in the longitudinal direction of the food product, for example cuts made prior to the cut(s) made by the cutting device 2100 or subsequently to the cut(s) made by the cutting device 2100, e.g. cuts made by a high pressure water jet cutter or the like.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage.

The invention claimed is:

1. A cutting device for cutting a food product that is conveyed by a conveyor means, the cutting device comprising:
   a first cutting blade;
   a moving mechanism attached to said first cutting blade for moving the first cutting blade sideways in either direction across the conveyor means; and
   a control unit;
   wherein said first cutting blade is adapted to cut at least one incision in the product from one side of the product;
   wherein said control unit is adapted to control said first cutting blade and said moving mechanism based on image data of said food product, including utilizing said image data in instructing said moving mechanism to adjust the position of said first cutting blade across said conveyor means;
   wherein the cutting device further comprises a second cutting blade adapted to cut at least one incision in the product from a side opposite to the side of the first cutting blade, and where the control unit is further adapted to control the second cutting blade.

2. The cutting device according to claim 1, wherein said food product has, prior to being cut with one or more incisions, undergone a cutting process where at least one cut of the food product has been performed having an angle in relation to an axis extending across the conveyor and perpendicular to the conveying direction, where the adjustment of the moving mechanism comprises adjusting the position of at least said first cutting blade across said conveyor means such that it follows said at least one cut of the food product.

3. The cutting device according to claim 1, wherein said second cutting blade is further attached to said moving mechanism such that both the first and the second cutting blades are moved sideways in either direction across the conveyor means while the internal position of said first and second cutting blades are maintained fixed.

4. A cutting device according to claim 1, wherein the controlling by said control unit further comprises operating the first and the second cutting blades independently.

5. The cutting device according to claim 1, wherein said first and said second cutting blades are arranged within the same plane such that the cutting plane is substantially the same, where a distal end of said first cutting blade and a distal end of said second cutting blade, when said distal ends are facing each other, overlap partly.

6. The cutting device according to claim 5, wherein the rotational movement of the first and the second cutting blades is adjusted such that a phase shift of the first and the second cutting blades is present so as to avoid collision of the first and the second cutting blades when the cutting blades simultaneously are in a horizontal position and facing each other.

7. A method of cutting a food product conveyed by a conveyor means into pieces using a cutting device which comprises:
   a first cutting blade;
   a moving mechanism attached to said first cutting blade for moving the first cutting blade sideways in either direction across the conveyor means; and
   a control unit;
   wherein said first cutting blade is adapted to cut at least one incision in the food product from one side of the product;
   wherein said control unit is adapted to control said first cutting blade and said moving mechanism based on image data of said food product, including utilizing said image data in instructing said moving mechanism to adjust the position of said first cutting blade across said conveyor means;
   wherein the cutting device further comprises a second cutting blade adapted to cut at least one incision in the product from a side opposite to the side of the first cutting blade, and where the control unit is further adapted to control the second cutting blade.

8. The method according to claim 7, wherein said food product has, prior to being cut with one or more incisions, undergone a cutting process where at least one cut of the food product has been performed having an angle in relation to an axis extending across the conveyor and perpendicular to the conveying direction, where the adjustment of the moving mechanism comprises adjusting the position of at least said first cutting blade across said conveyor means such that it follows said at least one cut of the food product.

9. The method according to claim 7, wherein the food products are fish fillets and where the at least one cut includes cuts around the pin bones in the fish fillet.

10. The method according to claim 9, wherein the at least one cut further includes a cut extending along the fish fillet from the pin bones and at least partly towards the tail part of the fish fillet.

11. The method according to claim 7, wherein cutting the food product comprises cutting pieces of food products or cutting the food product with parts between the incisions to have a fixed target such as a fixed weight target.

12. A cutting system for cutting a food product conveyed by a conveyor means, comprising:
    an imaging system;
    a cutting device comprising:
      a first cutting blade;
      a moving mechanism attached to said first cutting blade for moving the first cutting blade sideways in either direction across the conveyor means;
      a control unit;
    wherein said first cutting blade is adapted to cut at least one incision in the product from one side of the product;
    wherein said control unit is adapted to control said first cutting blade and said moving mechanism based on image data of said food product, including utilizing said image data in instructing said moving mechanism to adjust the position of said first cutting blade across said conveyor means;
wherein the cutting system further comprises:
- a second cutting blade adapted to cut at least one incision in the product from a side opposite to the side of the first cutting blade, and where the control unit is further adapted to control the second cutting blade;
- a cutting mechanism operated by the control unit for performing at least one cut of the food product having an angle in relation to an axis extending across the conveyor and perpendicular to the conveying direction, where the adjustment of the moving mechanism comprises adjusting the position of at least said first cutting blade across said conveyor means such that it follows said at least one cut of the food product.

* * * * *